Oct. 7, 1952  J. L. PHILLIPS  2,612,919
KINK ELIMINATOR FOR HANDSAWS
Filed Sept. 19, 1949
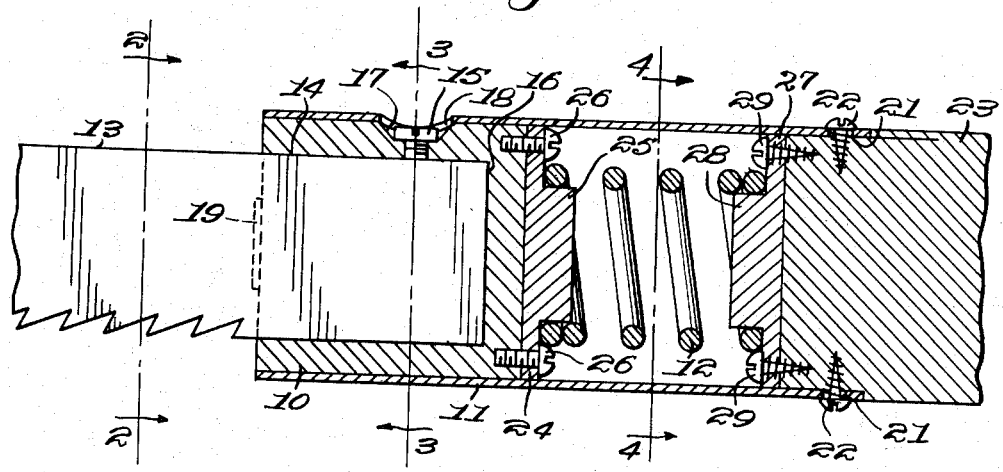
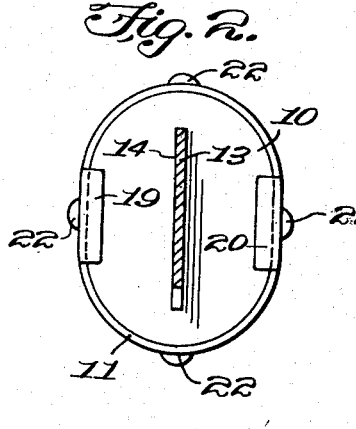
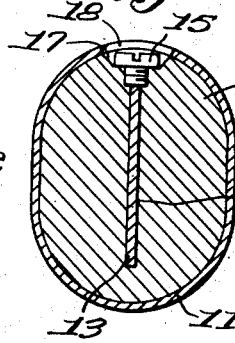
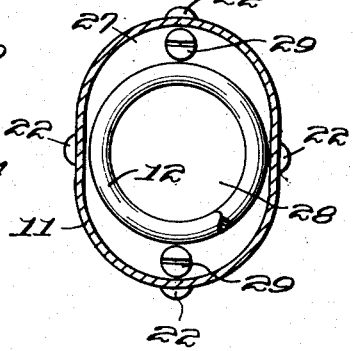
INVENTOR.
John L. Phillips,
BY Victor J. Evans & Co.
ATTORNEYS Patented Oct. 7, 1952

2,612,919

UNITED STATES PATENT OFFICE 2,612,919

KINK ELIMINATOR FOR HANDSAWS

John L. Phillips, Teague, Tex.

Application September 19, 1949, Serial No. 116,510

1 Claim. (Cl. 145—33)

This invention relates to a saw blade mounting for compass saws, coping saws, hack saws, and the like wherein a resilient element is incorporated between a movable blade holding socket and a handle for eliminating kinking, and in particular the invention includes a sleeve attached to the end of a saw handle with a blade holding socket in the outer end of the sleeve and with a spring between the ends of the handle and socket to provide a slight yielding action as the saw blade is pushed forward by the handle.

The purpose of this invention is to provide means for providing a slight yielding action or "give" in the saw mounting end of a saw handle to reduce kinking of a saw blade mounted in the handle and to facilitate sawing sheet metal with hack saws and the like.

It is difficult to saw sheet metal with a hack saw as the teeth catch in the edge of the material and cause a kinking or bending action that breaks saw blades. With this thought in mind this invention contemplates an improved mounting through which saw blades are attached to handles whereby a slight resiliency is provided between the blade and handle to compensate for the jerky action resulting from hack saw teeth passing through sheet metal.

The object of this invention is, therefore, to provide means for incorporating a yielding element in the saw blade attaching end of a saw handle or the like whereby sheet metal and the like may be cut with hack saws with perfect ease.

Another object of the invention is to provide means for incorporating a resilient element in saw blade mountings that may be used in saws now in use.

A further object of the invention is to provide a yielding element in a saw vlade mounting in which the mounting is of a simple and economical construction.

With these and other objects and advantages in view the invention embodies a shell attached to the end of a saw mounting shank or handle with a piston or saw mounting socket slidably mounted in the shell, with a resilient element between the piston and end of the handle and with means for securing the saw blade in a socket in the piston.

Other features and advantages of the invention will appear from the following description taken in connection with the drawings wherein:

Figure 1 is a longitudinal section through a saw blade mounting with parts of the blade and handle broken away;

Figure 2 is an end elevational view of the mounting taken on line 2—2 of Figure 1 and with a saw blade mounted therein shown in section.

Figure 3 is a similar section taken on line 3—3 of Figure 1.

Figure 4 is a similar section taken on line 4—4 of Figure 1.

Referring now to the drawings wherein like reference characters denote corresponding parts the yielding saw blade mounting of this invention includes a piston 10 slidably mounted in a sleeve 11 with the piston urged outwardly by a spring 12 and with a saw blade 13 secured in a socket 14 in the piston with a screw 15.

The piston 10 is shaped to correspond with the inner surface of the sleeve 11 which, as illustrated in the drawings, is substantially of an elliptical shape and the socket 14 which is centrally positioned therein extends inwardly from the outer end to a point 16 providing a surface at the inner end of the piston against which the end of the saw is positioned. The upper surface of the piston is provided with a recess 17 with the head of the screw 15 positioned therein, whereby the piston with the screw therein slides back and forth in the sleeve.

The sleeve 11 is provided with an opening 18 to provide access to the screw 15 to facilitate removing and replacing saw blades in the socket of the piston. The outer end of the sleeve 11 is provided with inwardly extended flanges 19 and 20 that are positioned to limit outward movement of the piston. The inner end of the sleeve 11 is provided with screw openings 21 through which screws 22 may be inserted for mounting the sleeve on the pin 23 of a handle or the like.

A spring guide 24 with a boss 25 thereon is attached to the inner end of the piston by screws 26 and a corresponding guide 27 with a spring retaining boss 28 thereon is attached to the end of the handle by screws 29. The spring 12 is positioned with the ends over the bosses 25 and 28 and with the free length of the spring slightly greater than the distance between the guides the blade holding piston is maintained under tension whereby, as a saw blade is forced forwardly a slight yielding action is provided.

It will be understood that the shape of the sleeve in cross section and also the corresponding shape of the other elements may be modified to correspond with the shape of the saw handle whereby saw mounting devices of this type may be provided for substantially any type of saw.

It will be understood that other modifications may be made in the design and arrangement of the parts without departing from the spirit of the invention.

What is claimed is:

In a saw blade mounting, the combination which comprises a sleeve extended outwardly from the end of a saw handle, means attaching the sleeve to the handle, said sleeve having inwardly extended flanges on the outer end and an opening therethrough spaced from the outer end, a disk like spring guide on the inner ends of the piston and handle having a centrally located boss thereon, a piston having a saw blade receiving socket therein slidably mounted in said sleeve, a screw threaded in the piston positioned to register with the opening in the sleeve and also positioned to engage a saw blade in the socket of the piston, and a spring positioned between the guides on the bosses on the piston and end of the saw handle.

JOHN L. PHILLIPS.

REFERENCES CITED

The following references are of record in the file of this patent:

UNITED STATES PATENTS

| Number | Name | Date |
| --- | --- | --- |
| 488,844 | Smith | Dec. 27, 1892 |
| 2,154,367 | De Froff | Apr. 11, 1939 |
| 2,525,235 | Myers | Oct. 10, 1950 |

FOREIGN PATENTS

| Number | Country | Date |
| --- | --- | --- |
| 191,105 | Great Britain | Jan. 1, 1923 |
| 381,525 | Germany | Sept. 21, 1923 |
| 512,611 | Great Britain | Sept. 21, 1939 |
| 612,528 | Great Britain | Nov. 15, 1948 |